United States Patent [19]

Holtrop et al.

[11] Patent Number: 4,531,994

[45] Date of Patent: Jul. 30, 1985

[54] PROCESS FOR PREPARING A THERMOFORMABLE LAMINATE STRUCTURE

[75] Inventors: James S. Holtrop, South Windsor, Conn.; Richard P. Maurer, Wilbraham, Mass.

[73] Assignee: Monsanto Company, St. Louis, Mo.

[21] Appl. No.: 647,096

[22] Filed: Sep. 4, 1984

Related U.S. Application Data

[63] Continuation-in-part of Ser. No. 553,594, Nov. 21, 1983, Pat. No. 4,476,183, and a continuation-in-part of Ser. No. 553,462, Nov. 21, 1983, Pat. No. 4,489,126.

[51] Int. Cl.³ .................... B32B 5/18; B32B 31/00
[52] U.S. Cl. ................... 156/307.3; 156/307.7; 428/246; 428/286; 428/287; 428/290; 428/304.4; 428/319.7
[58] Field of Search ............. 156/78, 307.3, 307.7; 428/246, 286, 287, 290, 304.4, 319.7

[56] References Cited

U.S. PATENT DOCUMENTS

| | | | |
|---|---|---|---|
| 3,303,086 | 2/1967 | Demers | 428/319.3 |
| 3,355,535 | 11/1967 | Hain et al. | 264/321 |
| 3,531,367 | 9/1970 | Karsten | 428/317.7 |
| 3,565,746 | 2/1971 | Stevens | 428/316.6 |
| 3,654,063 | 4/1972 | Blackburn et al. | 428/304.4 |
| 3,787,259 | 1/1974 | Kleinfeld et al. | 156/78 |
| 3,817,818 | 6/1974 | Riding et al. | 428/316.6 |
| 3,833,259 | 9/1974 | Pershing | 428/316.6 |
| 4,065,596 | 12/1977 | Groody | 428/215 |
| 4,147,828 | 4/1979 | Heckel et al. | 428/255 |
| 4,167,824 | 9/1979 | Wolpa | 428/316.6 |
| 4,388,363 | 6/1983 | Fountain | 428/215 |
| 4,476,183 | 10/1984 | Holtrop et al. | 428/286 |
| 4,478,660 | 10/1984 | Landler et al. | 156/307.7 |
| 4,489,126 | 12/1984 | Holtrop et al. | 428/246 |

FOREIGN PATENT DOCUMENTS 2906259 8/1980 Fed. Rep. of Germany ... 428/319.7

Primary Examiner—William J. Van Balen
Attorney, Agent, or Firm—Thomas E. Kelley; Arthur E. Hoffman

[57] ABSTRACT

A process for preparing thermoformable laminate structure comprising foamed thermoplastic sheet having a fabric adhesively bonded to one surface thereof.

11 Claims, No Drawings

PROCESS FOR PREPARING A THERMOFORMABLE LAMINATE STRUCTURE

This application is a continuation in part of applications Ser. Nos. 553,594 and 553,462, both filed Nov. 21, 1983 now U.S. Pat. Nos. 4,476,183 and 4,489,126 respectively and incorporated herein by reference issued as U.S. Pat. Nos. 4,476,183 and 4,489,126, respectively.

This invention relates to thermoplastic materials, and particularly to a thermoformable laminate structure comprising foamed thermoplastic sheet which may be molded into complex shapes. More particularly this invention relates to a method for fabricating a thermoformable laminate structure having a fabric coating which is adhered with a polymer which has a high softening temperature.

DESCRIPTION OF THE PRIOR ART

Foamed thermoplastic laminates have been used for many years. These laminates were most often formed as a sandwich structure in which the foamed thermoplastic material was enclosed between liner board facings. An example of this construction is a polystyrene foam sheet which has a kraft paper liner board facing on each side. Such laminate has been formed by die-cutting or scoring and by pressing the board and applying a resin to fix the pressed shape. However, the kraft paper liner board facing is a material which is not easily molded and which has a tendency to wrinkle during any molding of the laminate structure.

Other efforts have been made to provide a laminate structure which may more easily be molded. A thermoplastic laminate has been formed of a layer of foamed styrene-maleic anhydride polymer to which a thermoplastic polymer skin is bonded. This laminate is moldable without the problems caused by the earlier developed paper facings.

More recent efforts have provided moisture-resistant, moldable thermoformable laminate structures formed from foamed thermoplastic sheet which are faced by a polymer impregnated cloth. For instance the cloth can be impregnated with an acrylic polymer having a high softening temperature.

Such laminate structures have been formed, for instance, by soaking the cloth in a solution of polymer to impregnate the cloth with the solution of polymer. The solvent is allowed to evaporate to provide a cloth impregnated with the polymer. Laminates have been formed by bonding such cloth impregnated with polymer to a sheet of thermoplastic foam.

Such laminate forming procedure is not without disadvantages. For instance an inordinate amount of polymer is utilized on a unit area basis in making such laminate structures. Also excessive time is required to allow for solvent evaporation from the cloth impregnated with polymer solution.

The process of the invention provides a thermoformable laminate structure having polymer impregnated cloth adhered to at least one side of a sheet of thermoplastic foam, without the disadvantages of prior art processes.

SUMMARY OF THE INVENTION

This invention provides a process comprising applying a polymer emulsion film to a surface of a sheet of thermoplastic foam; allowing the emulsion film to dry by evaporation of liquids; applying a cloth to the dry emulsion film; impregnating the cloth with the polymer of the film by applying heat and pressure to the surface of the cloth; and adhering the cloth to the sheet of thermoplastic foam by removing said heat and pressure from the surface of the cloth, allowing the polymer to cool and solidify.

Alternatively the film can be applied to the wet emulsion film. By applying heat and pressure, moisture is driven off while the cloth is laminated to the thermoplastic foam.

A further process provided by this invention comprises applying a polymer emulsion film to a surface of a sheet of thermoplastic foam; applying a cloth to the emulsion film and allowing the polymer to impregnate the cloth; allowing the emulsion to dry by evaporation of liquids; adhering the cloth to the sheet by applying heat and pressure whereby the emulsion solids become plastic and removing the heat and pressure to allow the polymer to cool and solidify.

DESCRIPTION OF PREFERRED EMBODIMENTS

The process of this invention provides thermoformable laminate structures comprising a sheet of foamed thermoplastic having adhered to at least one side a polymer-impregnated cloth, preferably utilizing a polymer having a softening temperature of at least 75° C.

The foamed thermoplastic sheet can comprise a variety of foamable thermoplastic materials for instance polystyrene, styrene copolymers such as styrene-maleic anhydride polymer and styrene-acrylonitrile polymer, and the like. Foamed thermoplastic sheets may also comprise other foamed thermoplastic material which would be substantially rigid at moderate temperatures for instance polyolefins such as polyethylene. The preferred material for providing the foamed thermoplastic sheet useful in the process of this invention comprises polystyrene and is thermoformable at temperatures up to about 180° C.

The foamed thermoplastic sheet can be provided in any thickness desired. Foamed thermoplastic sheet which is particularly useful in the laminate of this invention will generally be less than 30 millimeters in thickness. The preferred thickness of the foamed thermoplastic sheet for use in fabricating composite laminates will generally be between 2 millimeters and 20 millimeters.

The process of this invention provides a polymer-impregnated cloth adhered to at least one side of the foamed thermoplastic sheet. The polymer-impregnated cloth provides stability to the laminate, for instance a composite laminate, which has been thermoformed into a complex shape at thermoforming temperatures in the range of 130° C. to 80° C. Such thermoforming temperature range is limited at the lower temperature of 130° C., the temperature at which the foamed thermoplaslic sheet is readily thermoformable. This range is limited at the higher temperature by the degradation (i.e., foam collapse) temperature of the material of the foamed thermoplastic sheet. Accordingly, the upper level of the thermoforming temperature range depends on the foamed thermoplastic material utilized. Temperatures of up to about 180° C. are satisfactory for molding laminates using foam comprising styrenemaleic anhydride copolymers. However the upper temperature limit for thermoforming laminates using foam consisting of polystyrene is about 150° C.

For purposes of this invention the term "softening temperature" is intended to mean softening point as determined by thermomechanical analysis using a program designated "TADS TMS STD TEVO1.04 PCN 05.06B01.01.04" provided by Perkin Elmer using a Perkin Elmer Model TMS2, Thermomechanical Analyzer. Analytical parameters were: probe load: 10 grams; minimum temperature: 25° C.; maximum temperature: 200° C.; heating rate: 5° C. per minute; cooling rate: 20° C. per minute; penetration probe: round tip. Polymer samples were approximately ¼ inch×⅛ inch×1/16 inch (6.35 mm×3.18 mm×1.6 mm). Thermomechanical analysis comprises placing a weighted compression probe on a thin sample which is slowly heated at a uniform rate. The temperature at which the probe begins to penetrate the sample is the softening point which is determined by the intersection of tangent lines about the inflection point on the plot of penetration distance versus temperature near the temperature at which the probe begins to penetrate the sample.

Polymer emulsions useful in the process of this invention comprise particles of polymer dispersed in a vehicle, for instance comprising water. Preferred emulsions can contain up to about 50 percent by weight of solid polymer particles. Alternatively, the emulsion can comprise hiqher amounts of solid polymer particles say up to 80 percent by weight. Preferred polymer comprises acrylic polymer. Such polymer has a softening temperature greater than 75° C., but lower than the minimum thermoforming temperature of foamed thermoplastic sheet, for instance about 130° C. or up to about 180° C.

The cloth can comprise a variety of textile structures for instance the cloth may be woven or non-woven. A desired characteristic of the cloth is that it elongates sufficiently in a direction in its surface to conform to the desired complex shape to be imparted by the thermoforming process. Desirable cloth will comprise a fabric that can elongate, for instance in the range of about 10–50 percent, at thermoforming temperature without destroying integrity of the fabric structure. Since woven cloths of natural or glass fibers generally exhibit elongation of less than 10 percent, they are not useful in providing moldable, thermoformable laminates. Preferred cloth which can undergo such elongation comprises non-woven fabric such as non-woven spun-bonded polyester fabric. Other cloths which may be useful include non-woven polyester, non-woven nylon and non-woven polypropylene. The cloth can have any thickness which may be desired. Typically useful cloth will have a thickness in the range of 0.05 to 1.0 millimeters. However, cloth having a larger thickness may be used. Preferably the cloth will be non-woven and will have a thickness of from 0.1 to 0.4 millimeters. Typically useful cloth will also have a basis weight in the range of 0.3 to 10.0 ounces per square yard (10–340 grams per square meter), preferably in the range of 1.0 to 6.0 ounces per square yard (34–203 grams per square meter).

The process of this invention utilizing a polymer emulsion film to fabricate cloth faced foam laminates is generally more economical than other methods in that substantially lower quantities of polymer are required to form a laminate. For instance, it has been found that less than 16 grams (for instance, from about 5 to 8 grams) polymer is required per square meter of laminate by this process using polymer emulsion film. On the other hand it has been generally found that about 40 grams of polymer are utilized per square meter of laminate in those processes where the cloth is soaked in a polymer solution before application to the foam sheet.

The cloth can be laid over the wet polymer emulsion film. The composite of cloth, polymer emulsion film and foamed thermoplastic sheet can then be optionally calendared to promote penetration of the polymer emulsion film into the cloth. The laminate can be formed by allowing the solvent to evaporate from the polymer emulsion at the outer surface of the cloth.

Alternatively the polymer emulsion film overlaying a surface of the foamed thermoplastic sheet can be allowed to dry prior to application of the cloth. The cloth can be applied to the dry film and the laminate formed by the application of heat and pressure. For instance, a hot surface having a temperature of about 120° to 150° C. can be pressed on the cloth to cause the polymer film to penetrate into and impregnate the cloth.

A suitable polymer emulsion may contain an adhesive to promote adhesion of the polymer emulsion film to the foamed thermoplastic sheet. Such adhesive can comprise an acrylic adhesive such as is available from Rohm and Haas as E2138 acrylic adhesive or E1958 acrylic adhesive. Such adhesive can be mixed, for instance, in equal weight proportions, with the acrylic emulsion, such is available from S. C. Johnson & Son, Inc. as Joncryl 89 styrenated acrylic dispersion, a water based emulsion of about 48 percent by weight acrylic solids, having a softening temperature of 101° C. The following structures illustrate laminate structures made in accordance with this invention.

EXAMPLE I

This example illustrates the forming of a moldable, thermoformable laminate structure according to the process of this invention.

A mixture of polymer emulsion was prepared by combining equal weights of two aqueous acrylic emulsions.

The first aqueous acrylic emulsion was identified as Joncryl TM 89 styrenated acrylic dispersion (available from S. C. Johnson & Son, Inc., Johnson Wax Chemical Products Division) which comprises 48±1 percent by weight solids in water at a pH in the range of 8.0 to 8.5. The emulsion has a milky appearance, a viscosity in the range of 400 to 600 centipoises and a density of 8.7 pounds per gallon (1.04 g/cm$^3$).

The second aqueous acrylic emulsion was identified as adhesive E-2138 (available from Rohm and Haas Company) which comprises 51 to 53 percent by weight acrylic polymer in water at a pH in the range of 8.2 to 8.6. The emulsion has a milky-blue color, a mild ammoniacal odor due to about 25 ppm of ammonia, and contains about 0.5 ppm of formaldehyde. The emulsion has a viscosity in the range of 40,000 to 50,000 centipoises.

The mixture of the two acrylic polymer emulsions was applied in a thin film to one surface of a sheet of polystyrene foam having a thickness of about 130 mils (3.3 mm) and a density of about 42 pounds per thousand square feet (205 grams per square meter). The film was applied at a thickness of about 0.75 mil ($19 \times 10^{-6}$ m) with a No. 8 stainless steel metering rod comprising No. 8 wire (having a diameter of 0.162 inches (4.1 mm)) wound on a rod having a diameter of ½ inch (about 13 mm). The emulsion film was applied at about 1.5 pounds per thousand square feet (7 gm/m$^2$).

While the film was still wet, a piece of spun-bonded, non-woven polyester fabric was laid onto the emulsion coated surface of the polystyrene foam. The polyester fabric had a basis weight of 1.0 ounces per square yard ($33.9$ gm/m$^2$) and is identified as Reemay 2014 by duPont.

The fabric was then laminated to the polystyrene foam in a Wabash Hydraulic Press, Model 50-2424-2 STMA, by Wabash Metal Products, Inc., having steam heated plates set for a temperature of 260° F. (127° C.). The press was equipped with shims which provided a forming cavity in which the foam was allowed to expand. The wet laminate was heated within the press for 30 seconds, after which the press was cooled for about 90 seconds to a temperature of about 100° F. (38° C.). The laminate sheet then had a thickness of about 150 mils (3.8 mm).

The polyester fabric was laminated to the polystyrene foam with good adhesion. Adhesion can be determined by pulling the fabric to effect delamination. If fibers from the non-woven fabric separate from the fabric and are left adhered to the foam, adhesion is considered excellent. If there is delamination with no fibers left on the foam, adhesion is considered good.

EXAMPLES II-V

The lamination procedure of Example I was repeated using a variety of non-woven fabrics.
  II. Fabric: non-woven polypropylene having a basis weight of 68 gm/m$^2$. Adhesion: good.
  III. Fabric: non-woven polypropylene having a basis weight of 105 gm/$^2$. Adhesion: good.
  IV. Fabric: non-woven polyester having a basis weight of 163 gm/m$^2$. Adhesion: exoellent.
  V. Fabric: non-woven polyester having a basis weight of 197 gm/m$^2$. Adhesion: excellent.

Although adhesion is only good in the laminate of Examples II and III, such laminates would be acceptable and suitable for less severe applications.

EXAMPLE VI

This example illustrates the thermoformability of the laminate structures prepared according to the process of this invention as illustrated in Example I.

The laminate structure prepared in Example I was thermoformed in a Comet thermoformer, Labmaster Model 14×20, by Comet Industries, Inc. The three-dimensional mold was of a design representing a seat buckle cover as used in some General Motors automobiles. The thermoformer operates by carrying the flat laminate sheet into an infrared heater section to preheat the flat laminate sheet to a softening temperature for the material of the sheet so that the sheet can be readily formed. The sheet was in the heater section for 8 seconds where it reached a temperature in the range of 260° to 290° F. (127°–143° C.). The heated sheet was then moved into the open mold block which was heated to 70° F. (21° C.). The cooled molded laminate had good three-dimensional definition with no signs of delamination and no wrinkles.

EXAMPLES VII-X

The thermoforming procedure of Example VI was repeated using the laminate structures prepared in Examples II-V.
  VII. Thermoforming of the laminate sheet prepared in Example II. The cooled molded laminate had good three-dimensional definition, but the polypropylene fabric partially delaminated from the polystyrene foam.
  VIII. Thermoforming of the laminate sheet prepared in Example 111. The cooled molded laminate had good three-dimensional definition, but the polypropylene fabric partially delaminated from the polystyrene foam.
  IX. Thermoforming of the laminate sheet prepared in Example IV. The cooled molded laminate had good three-dimensional definition with no signs of delamination and no wrinkles.
  X. Thermoforming of the laminate sheet prepared in Example V. The cooled molded laminate had good three-dimensional definition with no signs of delamination and no wrinkles.

Although there was some delamination and wrinkles in the laminates thermoformed in Examples VII and VIII, such laminates comprising polypropylene fabric would be suitable for applications requiring less severe thermoforming, for instance, such as automobile headliners where the thermoforming mold would not draw as deeply or at sharp angles.

USES OF THE THERMOFORMABLE LAMINATE

The thermoformable laminate sheet prepared according to the process of this invention is useful in preparing molded thermoplastic foam articles.

Such molded thermoplastic foam articles are particularly useful when thermal or sound insulation is a desired property. The laminate provides three-dimensional rigidity over a wide temperature range.

This thermoformable laminate sheet is particularly useful in preparing headliners for automobiles where the laminate provides for noise attenuation within the automobile. A particular useful headliner can be prepared by utilizing two laminate sheets prepared according to this invention as covers for an inner core of a third polymeric foam, for instance a 250 mil (6.35 mm) thick, soft polyurethane foam. The three part composite can be prepared by using an adhesive on the bare surface of the laminate sheet to adhere to the soft, foam core. The composite has the acrylic emulsion adhered fabric on its outer surfaces which allows for thermoformability of the composite. One surface of the composite can be covered with a vinyl covered, soft foam trim for an aesthetic interior surface. Such automotive headliners are described in copending application Ser. No. 553,594 issued as U.S. Pat. No. 4,476,183.

While specific embodiments of the invention have been described, it should be apparent to those skilled in the art that various modifications thereof can be made without departing from the true spirit and scope of the invention. Accordingly, it is intended that the scope of the following claims cover all such modifications which fall within the full inventive concept.

We claim:

1. A process for forming a moldable thermoformable laminate structure having polymer impregnated cloth adhered to at least one side of a sheet of thermoplastic foam comprising
  (a) applying a polymer emulsion film to a surface of a sheet of thermoplastic foam;
  (b) allowing the emulsion film to dry by evaporation of emulsion liquids;
  (c) applying a cloth to the dry emulsion film;
  (d) impregnating the cloth with the polymer of the film by applying heat and pressure to the surface of the cloth whereby the polymer becomes plastic and impregnates the cloth;
  (e) and adhering the cloth to the sheet of film of plastic foam by removing said heat and pressure from the surface of the cloth, thereby allowing the polymer to cool and solidify.

2. The process of claim 1 wherein said sheet of thermoplastic foam comprises polystyrene or a copolymer of polystyrene.

3. The process of claim 2 wherein said polymer emulsion comprises an acrylic polymer having a softening temperature greater than 75° C.

4. The process of claim 3 wherein said emulsion film is applied to the sheet in an amount between 5 and 8 grams of liquid per square meter.

5. The process of claim 4 wherein the cloth comprises a non-woven fabric.

6. A process for providing a moldable, thermoformable laminate structure having polymer impregnated cloth adhered to at least one side of a sheet of thermoplastic foam comprising:
 (a) applying a polymer emulsion film to a surface of a sheet of thermoplastic foam;
 (b) applying a cloth to the emulsion film and allowing the polymer to impregnate the cloth; and
 (c) adhering the cloth to the sheet by applying heat and pressure whereby the emulsion solids become plastic and removing the heat and pressure to allow the polymer to cool and solidify.

7. The process of claim 6 wherein the polymer emulsion film is allowed to dry prior to applying heat and pressure.

8. The process of claim 6 wherein the sheet of thermoplastic foam comprises polystyrene or a copolymer of polystyrene.

9. The process of claim 8 wherein the polymer emulsion film comprises an acrylic polymer emulsion wherein said polymer has a softening temperature greater than 75° C.

10. The process of claim 9 wherein the polymer emulsion film is applied to the surface of a sheet of thermoplastic foam at a level between 5 and 8 grams of liquid per square meter of thermoplastic foam.

11. The process of claim 10 wherein the cloth is a non-woven cloth.

* * * * *